Figure 1:
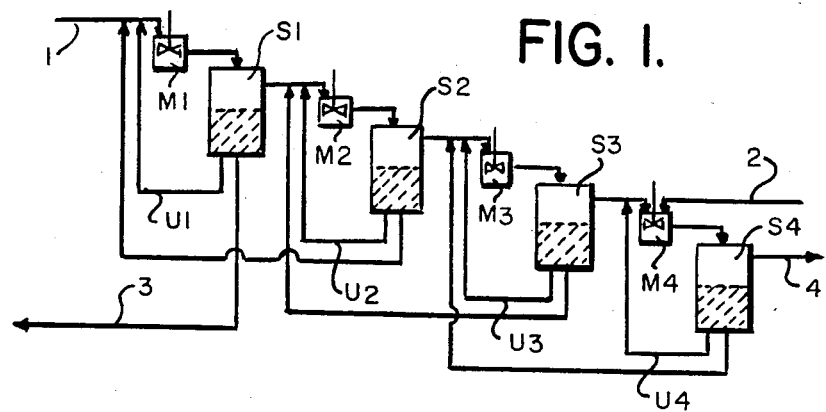

United States Patent [19]

Biller

[11] Patent Number: 4,798,909

[45] Date of Patent: Jan. 17, 1989

[54] PROCESS FOR RECOVERY OF POLYARYLPOLYAMINES

[76] Inventor: Efim Biller, Dufourstrasse 42, Zurich, Switzerland

[21] Appl. No.: 555,422

[22] Filed: Nov. 23, 1983

Related U.S. Application Data

[60] Continuation of Ser. No. 95,023, Nov. 16, 1979, abandoned, which is a division of Ser. No. 914,814, Jun. 12, 1968, Pat. No. 4,250,114, which is a continuation of Ser. No. 792,951, May 2, 1977, abandoned, which is a continuation-in-part of Ser. No. 690,341, May 6, 1976, abandoned, which is a continuation-in-part of Ser. No. 474,302, May 30, 1974, abandoned.

[30] Foreign Application Priority Data

Jun. 1, 1973 [AT] Austria ................... 4826/73
Sep. 17, 1973 [AT] Austria ................... 7991/73
Apr. 29, 1974 [AT] Austria ................... 3508/74
Nov. 11, 1975 [CH] Switzerland ........... 14618/75
May 5, 1976 [CH] Switzerland ........... 5854/76
Aug. 4, 1976 [CH] Switzerland ........... 10049/76
Nov. 6, 1976 [CH] Switzerland ........... 14011/76

[51] Int. Cl.$^4$ .................................. C07C 87/50
[52] U.S. Cl. ........................ 564/334; 564/330; 564/333
[58] Field of Search ............... 564/330, 331, 333, 334

[56] References Cited

U.S. PATENT DOCUMENTS 4,130,588 12/1978 Martin et al. ................... 260/570

Primary Examiner—Robert V. Hines
Attorney, Agent, or Firm—Sprung Horn Kramer & Woods

[57] ABSTRACT

An arylamine such as aniline is condensed with formaldehyde in the presence of aqueous hydrochloric acid to form a mass containing the hydrogen chloride salt of a polyarylpolyamine. The mass is contacted with additional aniline thereby forming an organic phase and an aqueous phase, the 4,4'-polyarylpolyamine overwhelmingly being liberated from its salt form in the aqueous phase and being transferred to the organic phase. High recoveries of the 4,4'-diamino polycondensate are achieved.

6 Claims, 1 Drawing Sheet

PROCESS FOR RECOVERY OF POLYARYLPOLYAMINES

This application is a continuation of application Ser. No. 095,023, filed 11/16/79, and now abandoned, which is a division of application Ser. No. 914,814, filed 6/12/68, and now U.S. Pat. No. 4,250,114, which is a continuation of Ser. No. 792,951, filed 5/2/77, now abandoned, which is a continuation-in-part of application Ser. No. 690,341, filed 5/6/76, now abandoned, which is a continuation-in-part of application Ser. No. 474,302, filed 5/30/74, now abandoned.

Di-aminoaryl-methane and mixtures of polyaryl-polyamines with methylene bridges (hereafter called "polyamines") are of considerable technical and economic importance, both as hardeners for epoxy resins adn elastomeric polyurethanes and as intermediates for the production of the corresponding di- and polyisocyanatus by phosgenation.

The production of these polyamines by acid condensation of arylamines and formaldehyda has been known for a long time and has been described, for example, in the U.S. Pat. No. 2,683,730. The acids used in the process are strong mineral acids, particularly hydrochloric acid.

The relative amounts of arylamine, formaldehyde and acid vary in this process within wide limits. Mole ratios of arylamine and formaldehyde are between 10:1 and 1:1, mole ratios of arylamine and acid between 20:1 and 1:1.

In the condensation reaction a number of compounds are formed, of which the 4,4-isomeres are the most valuable. The 2,2- and the 2,4 isomeres are less valued by-products. High amounts of acid tend to increase the formation of 4,4-isomeres.

The product polyamines are usually obtained as a solution of the amine salts of the acid used, and have to be recovered by the addition of alkaline liquors, such as sodium carbonate or sodium hydroxide. As a consequence fresh acid must be used for each condensation bath, and large amounts of waste salt solution are produced as a by-product. This is a serious disadvantage of the process.

The German Offenlegungsschrift No. 2,227.110 describes a process avoiding the neutralisation step by working in very dilute solutions. Because of the limits of solubility two phases are formed: an organic phase containing part of the product and little acid, and an aqueous phase containing the rest of the product amines and the larger part of the acid. The aqueous phase is used again in a subsequent condensation batch of arylamine and formaldehyde. Because of the peculiar nature of the solubility relationships in the arylamine-hydrochloric acid-water systems the phase separation can be achieved by dilution with water or with arylamine, depending on the amount of acid used, and on the separation temperature, which is kept at 50° to 100° C. The aqueous phase, which is recycled, contains 25 to 35% of the product formed and contains more of the 4,4-isomere than the organic phase. Part of this is lost in the subsequent condensation reaction.

The German Offenlegungsschriften No. 2,238.379 and 2,238.920 therefore suggest the addition of an inert hydrophobic solvent, such as chlorobenzene and additional arylamine, to increase the recoverable amount of the product by extraction. Although the recovery is increased, the aqueous phase contains more of the valuable 4,4-isomere, so that the product obtained has a higher concentration of 2,4-isomere, which is a disadvantage.

The German Offenlegungsschrift No. 2,343.658 teaches the extraction of the dissolved, unprotonated amines to exhaustion, but, as a consequence of the solubility equilibria involved, part of the product is still in the aqueous phase in form of the hydrochloric acid salt. Dilute solutions and high extraction temperatures (80° to 100° C.) are used, as these conditions favor the hydrolysis of the amine salts to the free amines, which can be extracted.

The German Offenlegungsschriften Nos. 2,2356.838; 2,500.573; 2,500.574 and 2,528.694 suggest a number of variations of the process, without being able to avoid the disadvantages of the process mentioned.

Up to the present there exists no technical process for the recovery of the polyamines from their solutions which recovers the product completely without neutralisation of the acid present with alkali.

The present invention covers a process for the recovery of virtually all the products of the condensation reaction of arylamines with formaldehyde in an acid medium by using ion-exchange between two liquid phases. The polyamines formed are present in the solution partially in protonated, partially in dissolved form, the equilibrium depending on the amount of acid present, as well as on the temperature and the concentration of the solution. The acid anions from this solution are exchanged against hydroxyl ions by contacting the solution with arylamine saturated with water in a number of stages in a two-phase liquid system according to the equilibrium

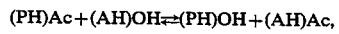

$$(PH)Ac + (AH)OH \rightleftharpoons (PH)OH + (AH)Ac,$$

where (PH) stands for the protonated polyamine, (AH) for the protonated arylamine, and Ac for the acid anion.

Two phases are formed, namely an organic phase (polyaryl amine-aryl amine) and an aqueous phase (aryl amine salt solution).

As this is a true equilibrium, the acid ions can be exchanged completely from the product into the arylamine phase by repeating the contact a number of times.

As the basis of the process is the presence of the protonated compounds, hydrolysis of the amine salts must be avoided by working at ambient temperature (15°–35° C.) and in concentrated solutions.

Small amounts of hydrophobic solvents (hereafter called WIS) can be added to the system to improve phase separation. Large amounts are to be avoided, as they prevent the protonisation of the amines, and so the exchange reaction.

The arylamine used for the ion-exchange is the same as was used for the preparation of the polyamine. The aqueous solution obtained in the process containing the salt of the arylamine and the acid exchanged and only very little of the polyamine, can be used again in a subsequent condensation reaction, so that the acid is, in fact, completely recycled.

In practice, the exchange is effected by repeatedly contacting the aqueous polyamine salt solutions with starting arylamines, preferably continuously, in countercurrent.

The exchange process may be carried out in various apparatuses either continuously or in batches. It is preferred to use mixer-settlers or countercurrent apparatuses.

The density of the phases is influenced by several factors, namely salt concentration in water and in arylamine and the content of polyarylamine in arylamine. The density of the phases is also governed by the catalyst. For example, the polyamines (of the aniline) methane sulphonic acid salts in water are lighter than the mixtures of aniline and polyarylamines.

With a 5% polyamine content, the aqueous solutions of the aniline methane sulphonate are in turn heavier than aniline. Phase reversal occurs. This phenomenon is unfavourable in terms of process technology.

Phase reversal may be avoided either by adding WIS or by using acid mixtures as catalysts.

The quantity of arylamines required for exchange is determined by the composition of the salts (polyamine content), the type of apparatus used and the procedure adopted. In cases where countercurrent installations are used, relatively small quantities are sufficient.

In general, the ratio by volume of the arylamines to aqueous salt solution may amount to between 5:1 and 1:10 and preferably to between 1:1 and 1:5.

In order to obtain the best possible exchange and separation effect with a minimal quantity of arylamine, it is best to circulate the arylamine in each stage in such a way that, of this liquid, only a part of the quantity which takes part in the exchange in one stage is conveyed into the next stage, whilst the rest is recycled to the same stage. If for example the ratio between the quantities of aqueous polyarylamine salt solution to be treated and the exchange arylamine amounts to 5:1 and if, in each stage, the quantity of arylamine recycled is 4 times the quantity of the arylamine (inner circuit), the overall ratio between the phases for the same input of arylamine amounts in each stage to 1:1, which provides for a better exchange effect and also for better phase separation.

It is also possible to keep the ratios between the streams in the stages different because the exchange effects vary in different stages. Exchange is far quicker at the beginning than at the end. It may also be advisable to change the inner circuit from stage to stage.

The at least partial insolubility of the arylamines in aqueous polyarylamine salt solutions (prerequisite for exchange) may also be obtained by the addition of WIS. This procedure can only be applied to a limited extent. The presence of relatively large quantities of WIS adversely affects the exchange.

Suitable WIS are any solvents which are immiscible with water and inert with respect to the reaction products. Particularly suitable WIS are benzene and alkyl benzenes, chlorinated hydrocarbons, alphatic and aromatic hydrocarbons, etc. It is of considerable advantage to use WIS which boil at temperatures in the same range as the arylamine used. They are distilled together with excess arylamine and recycled.

The solubility of arylamines in water and in acid salt solutions is governed to a large extent by the salt concentration.

The process may be adapted to these facts by working with different concentrations of salts in the countercurent installation; with maximum possible salt concentrations on the aqueous phase side and with minimum possible salt concentrations on the organic phase side.

This result may be achieved by introducing the polyarylamine salt solution into several mixing stages, rather than one mixing stage, in such a way that the highest salt concentration is encountered at about the middle of the exchange installation. It is also possible to introduce the aqueous polyarylamine salt solution into about the middle stage of the multistage installation and to work on one side with starting arylamine and, on the other side, with water in countercurrent (as is standard practice for example in countercurrent extraction with water as the reflux).

Another procedure is based on a combination of both processes: to begin with the PA/salt water solution is treated with arylamine/WIS, giving a 50 to 98% exchange. This is followed by treatment with pure arylamine and completion of the exchange process.

In practice, this means that the WIS is added to the stream of arylamine either in one stage or in several stages.

The exchange effect may also be enhanced for example by dividing the quantity of arylamine into two or more streams, introducing these streams into the exchange stages and then combining them in countercurrent. The use of an inner circuit is particularly important in cases where the quantities of arylamine are small.

The organic phase thus obtained should contain no more than 30 ppm of acid. This value may readily be obtained by washing with water, for example in a countercurrent extraction installation, preferentially at a temperature of 50°–90° C. The washing water may be used in the exchange installation.

The aqueous phase still contains dissolved starting arylamine. The dissolved starting arylamine may be removed either azeotropically by stripping (optionally with steam) or by extraction with hydrophobic solvents. The aqueous phase is then concentrated and introduced into the condensation stage.

The acid condensation mixture used in the process may be prepared in known manner by mixing a mixture of aromatic amine and acid catalyst with formaldehyde or formaldehyde donors and heating the precondensates formed to elevated temperatures for rearrangement. Conversely, it is also possible initially to react aromatic amine with formaldehyde and then to add the catalyst. In both cases, it does not matter whether the reaction is carried out in the presence or absence of water. In either case, the acid condensation mixture is suitable for the process according to the invention.

The quantity of water added is governed primarily by the molar ratio of arylamine to acid. Water should be added in such a quantity that the solubility of the arylamines is below a certain limit.

The concentration of salt in water is preferably adjusted to less than 50% and, with particular preference, to between 5% and 40%.

The water may be added in any way: after condensation by straightforward mixing first for washing the polyamine and then for dilution, or some for washing and the rest for dilution. It may also be injected into different stages in several streams.

The water of condensation, the water from formaldehyde and also from the addition are preferably removed in a single stage or multistage evaporator under pressure, in the absence of pressure or in vacuo, optionally after removal of the dissolved arylamine, and are recirculated following removal of the excess.

The arylamines used for preparing the condensation solution and for the ion-exchange may be any aromatic amines such as, for example, aniline, o-toluidine, m-toluidine, N-methyl aniline, N-ethyl aniline, 2,6-dimethyl aniline, 2,6-diethyl aniline, 2,6-diisopropyl aniline, 2,4-diaminotoluene and any mixtures of these amines. Aniline is preferably used as the arylamine in the process according to the invention.

Water-soluble acids with a pKa-value of less than 1.5 are particularly suitable for use in the process according to the invention. Examples of acids such as these are are hydrochloric acid, hydrobromic acid, sulphuric acid, trifluoromethane sulphonic acid, benzene sulphonic acid or phosphoric acid. Preferred catalysts are hydrochloric acid, trifluoroacetic acid and methane sulphonic acid. The above-mentioned acid may also be used in admixture with acid or neutral salts of these acids, such as for example the corresponding ammonium salts or even the coresponding alkali salts. It is of course also possible to use the salts formed from the above-mentioned acids and from the arylamine used as starting amine as sole catalysts at the very beginning of the process.

The process according to the invention is distinguished by the following advantages:
salt-free effluent
recovery of acid catalyst
elimination of the need for alkali
elimination of the need for the neutralisation apparatus
economic advantages.

EXAMPLE 1

186 g of aniline (2 moles) are introduced into a stirrer-equipped vessel, followed by the addition of 171 g of aqueous HCl (containing 1.5 mole of HCl). The contents of the vessel are then cooled to 25° C. After the 40.5 g 37% formaldehyde (0.5 moles) have been added, the contents of the vessel are stirred for 1 hour at 25° C. and then heated to 90° C. The rearrangement time is 4 hours. The contents of the reaction vessel are then diluted and cooled by the addition of 500 cc of cold water. A homogeneous aqueous solution containing approximately 20% of salt is obtained.

600 g of the above solution are mixed 4 times at 25° C. with 250 g of aniline, followed by separation. For analysis the aqueous phase obtained after the fourth exchange is neutralised with alkali to pH 8, the amine liberated is taken up in chlorofrm and washed twice with water. The sample is then analysed by thin layer chromatography (TLC) on silica gel with chloroform-methanol (95:5 by weight) as eluent.

The free amine from the aqueous phase is found to consist almost completely of aniline. More than 99% of the polyamine has been exchanged for aniline.

EXAMPLE 2

93 g of aniline, 68.6 g of 70% aqueous methane sulphonic acid and 57.4 g of water are stirred and reacted in a stirrer-equipped vessel. The solution is adjusted to 50° C., followed by the dropwise addition over a period of 20 minutes of 73 g of 18.5% formaldehyde.

The ratio of aniline/formaldehyde/methane sulphonic acid is 1:0,45:0.5. The total water content is approximately 50%.

Thereafter the contents of the vessel are kept for 1 hour at 50° C., and then for 2 hours at 70° C. and finally for 1 hour at 90° C.

On completion of the rearrangement, 295 cc of cold water are introduced and the temperature of the solution adjusted to 23° C.

This solution is treated 4 times with 200 g of aniline in the same way as in Example 1.

The thin layer chromatogram shows that the aqueous solution essentially contains aniline methane sulphonate only.

EXAMPLE 3

The condensation product of Example 2 is adjusted with water to a methane sulphonic acid content of 11%. Thereafter 100 g batches of the solution are mixed 5 times at room temperature, followed by separation:
(a) 30 g of aniline
(b) 30 g of aniline+7.5 g of monochlorobenzene
(c) 30 g of aniline+15 g of monochlorobenzene
(d) 30 g of aniline+30 g of monochlorobenzene.

After each treatment, a sample of the aqueous phase is neutralised and subjected to thin layer chromatography.

It was found that, in test (a), more than 99% of the polyamines were exchanged after only three treatments.
In test (b) 93% after 4 treatments
In test (c) approximately 80% after 5 treatments
In test (d) approximately 50% after 5 treatments.

EXAMPLE 4

The condensation product is adjusted with water to a methane sulphonic acid content of 15%. This composition is miscible with aniline. Two phases are formed by the addition of WIS.

3 100 g batches of the solution are treated 5 times at room temperature with the following mixtures:
(a) 30 g of aniline+7.5 g of monochlorobenzene
(b) 30 g of aniline+30 g of monochlorobenzene
(c) 30 g of aniline+30 cc of toluene.

It was found by thin layer chromatography that the exchange level is
(a) at about 98% after 5 treatments
(b) at 50% after 5 treatments
(c) at 50% after 5 treatments.

EXAMPLE 5

(FIG. 1)

Figure 2:
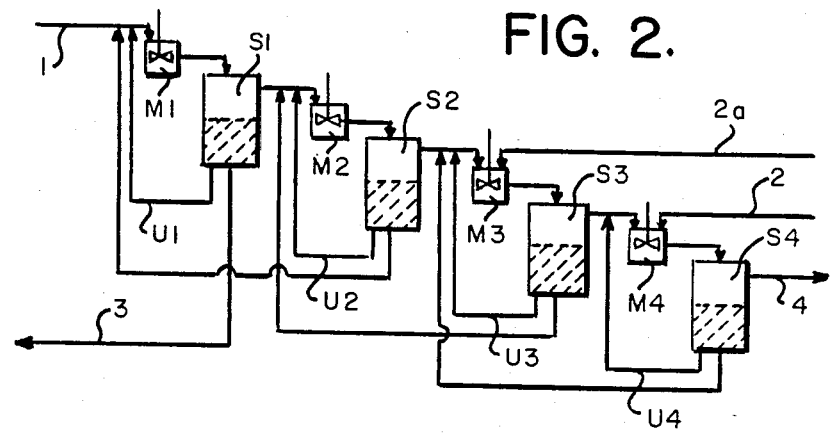
Figure 3:
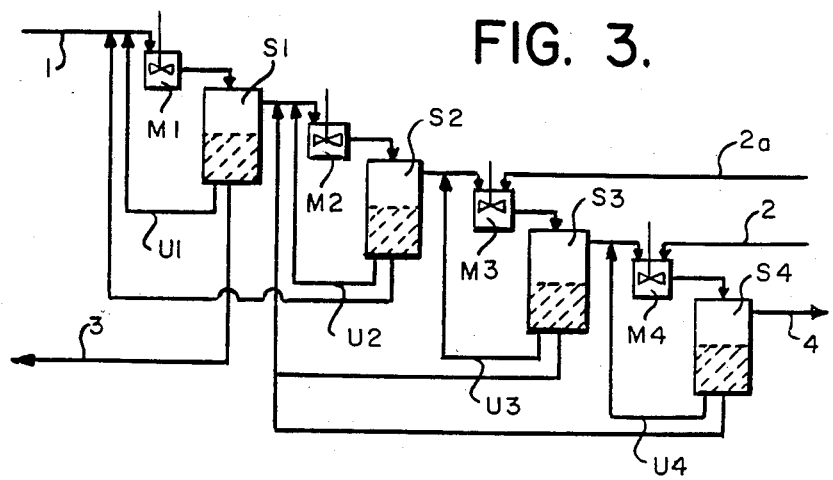

In FIGS. 1 to 3, $U_1$–$U_4$ together represent the circuit, $M_1$–$M_4$ are the mixers and $S_1$–$S_4$ the settlers.

A four-stage countercurrent mixer-settler installation corresponding to FIG. 1 is operated as follows:
650 parts/hour of aqueous solution consisting of
14.7% of polyamine (methylene dianiline and high PA)
5.6% of hydrochloric acid (100%)
79.7% of water
are introduced into the mixer 1 through pipe 1.

100 parts/h of aniline are pumped through pipe 2. The aniline phase is pump-circulated at 650 parts per hour in each mixer-settler stage. An aqueous solution containing 14% of aniline hydrochloride and substantially free from PA is obtained through pipe 4.

Polyamine/aniline mixture is obtained through pipe 3.

EXAMPLE 5a (FIG. 1)

The procedure is as in Example 5, the following streams being used:
650 parts/h of anaqueous solution consisting of 16% of polyamine (MDA+PA), 15% of methane sulphonic acid and 69% of water, and 150 parts/h of an organic solution consisting of 120 parts of aniline and 30 parts of o-dichlorobenzene.

The aqueous solution from pipe 4 contains 22% of a methane sulphonic acid/aniline/MDA-salt. Amine obtained by neutralisation consists of 98% of aniline and 2% of MDA.

EXAMPLE 5b (FIG. 2)

The procedure is as in Example 5, 90 parts/h of aniline being introduced through pipe 2 and 60 parts/h of a solution consisting of 30 parts of aniline and 30 parts of o-dichlorobenzene through pipe 2a. The salt contained in the aqueous solution obtained through pipe 4 consists almost entirely of pure aniline methane sulphonate. Polyamine/aniline mixture is obtained through pipe 3.

EXAMPLE 5c (FIG. 3)

The procedure is as in Example 5, except that 50 parts/h of aniline are introduced through each of the pipes 2 and 2a.

The organic phases of stages $S_3$ and $S_4$ are introduced together into the mixer $M_2$ through corresponding pipes.

Anaqueous solution containing 16% of aniline hydrochloride is obtained through pipe 4. The salt is substantially free from MDA.

EXAMPLE 6

Figure 4:
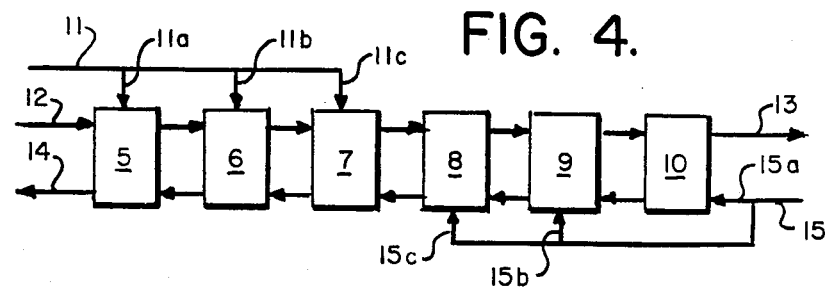

An exchange installation of the type shown in FIG. 4 with 6 exchange stages (5-10) (mixer-settler) is operated as follows:

the water used for washing the polyamine/aniline arrives through pipe 12. The condensation solution containing HCl is introduced through the pipes 11a, b, c in such a way that the concentration of HCl is adjusted as follows:

in stage 5: 1.5%
in stage 6: 3.5%
in stage 7: 5.6%.

Aniline arrives through pipe 15a, b, c, the sum of the stream being equal to 25% by volume of the total sum of 12+11a, b, c.

An aniline/polyamine stream 14 containing approximately 0,95% of HCl and an aqueous solution 13 of the aniline hydrochloride containing approximately 19% of salt and 5.6% of aniline are obtained.

The post-extraction stage gives an aniline hydrochloride solution with a concentration of approximately 25% which is concentrated by evaporation.

The aniline/polyamine stream was washed with water in a countercurrent extraction installation and worked up in accordance with the prior art.

I claim:

1. In a process for the preparation of polyamines wherein an aryl amine is reacted with formaldehyde in the presence of an acid catalyst to form said polyamine, sufficient water is employed to cause separation of the reactant mixture during extraction of said mixture with the aryl amine into an organic phase and an aqueous phase and subsequently returning the aqueous phase to the reactor and recovering the resultant polyamine from the organic phase by known means, the improvement which comprises conducting the extraction at about room temperature and conducting the extraction in the presence of a water soluble inorganic salt which is non-reactive with any of the components of the process.

2. The process of claim 1 wherein the arylamine is aniline and the polyamine is methylene dianiline.

3. In a process for the preparation of polyamines wherein an aryl amine is reacted with formaldehyde in the presence of an acid catalyst to form said polyamine, sufficient water is employed to cause separation of the reactant mixture during extraction of said mixture with the aryl amine into an organic phase and an aqueous phase and subsequently returning the aqueous phase to the reactor and recovering the resultant polyamine from the organic phase by known means, the improvement which comprises conducting the extraction at a temperature of from about 15° C. to 50° C. and conducting the extraction in the presence of a water soluble inorganic salt which is non-reactive with any of the components of the process.

4. In a process for the preparation of polyamines wherein an aryl amine is reacted with formaldehyde in the presence of an acid catalyst to form said polyamine, sufficient water is employed to cause separation of the reactant mixture during extraction of said mixture with the aryl amine into an organic phase and an aqueous phase and subsequently returning the aqueous phase to the reactor and recovering the resultant polyamine from the organic phase by known means, the improvement which comprises conducting the extraction in a single unit multi-stage extraction vessel at about room temperature employing a dual solvent system wherein one solvent is the aryl amine and the other is water, and conducting the extraction in the presence of a water soluble inorganic salt which is non-reactive with any of the components of the process.

5. A process of claim 4 wherein the arylamine is aniline and the polyamine is methylene dianiline.

6. In a process for the preparation of polyamines wherein an aryl amine is reacted with formaldehyde in the presence of an acid catalyst to form said polyamine, sufficient water is employed to cause separation of the reactant mixture during extraction of said mixture with the aryl amine into an organic phase and an aqueous phase and subsequently returning the aqueous phase to the reactor and recovering the resultant polyamine from the organic phase by known means, the improvement which comprises conducting the extraction in a single unit multi-stage extraction vessel at a temperature from about 15° to 50° C. employing a dual solvent system wherein one solvent is the aryl amine and the other is water, and conducting the extraction in the presence of a water soluble inorganic salt which is non-reactive with any of the components of the process.

* * * * *